United States Patent
Fetvedt et al.

(10) Patent No.: US 10,533,461 B2
(45) Date of Patent: Jan. 14, 2020

(54) SYSTEM AND METHOD FOR STARTUP OF A POWER PRODUCTION PLANT

(71) Applicant: 8 Rivers Capital, LLC, Durham, NC (US)

(72) Inventors: Jeremy Eron Fetvedt, Raleigh, NC (US); Brock Alan Forrest, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 492 days.

(21) Appl. No.: 15/180,330

(22) Filed: Jun. 13, 2016

(65) Prior Publication Data

US 2016/0363009 A1 Dec. 15, 2016

Related U.S. Application Data

(60) Provisional application No. 62/175,886, filed on Jun. 15, 2015.

(51) Int. Cl.
*F02C 3/34* (2006.01)
*F01K 25/10* (2006.01)
(Continued)

(52) U.S. Cl.
CPC ............ *F01K 25/103* (2013.01); *F01K 13/00* (2013.01); *F01K 13/02* (2013.01); *F02C 1/08* (2013.01);
(Continued)

(58) Field of Classification Search
CPC ...... F02C 3/34; F02C 7/10; F02C 7/08; F02C 7/26; F02C 1/08; F05D 2260/85; F05D 2210/12; F01K 25/103; F23L 7/007
See application file for complete search history.

(56) References Cited

U.S. PATENT DOCUMENTS

| 3,369,361 A | 2/1968 | Craig |
| 3,376,706 A | 4/1968 | Angelino |

(Continued)

FOREIGN PATENT DOCUMENTS

| CN | 1898499 | 1/2007 |
| CN | 101201171 | 6/2008 |

(Continued)

OTHER PUBLICATIONS

Allam et al., "High Efficiency and Low Cost of Electricity Generation from Fossil Fuels While Eliminating Atmopheric Emissions, Including Carbon Dioxide," GHGT-11, *Energy Procedia* 00, 2012, pp. 1-12.

(Continued)

*Primary Examiner* — William H Rodriguez
(74) *Attorney, Agent, or Firm* — Womble Bond Dickinson (US) LLP

(57) ABSTRACT

The present disclosure relates to systems and methods that provide power generation using predominantly $CO_2$ as a working fluid. In particular, the present disclosure provides for particular configurations for startup of a power generation system whereby the combustor may be ignited before the turbine is functioning at a sufficiently high speed to drive the compressor on a common shaft to conditions whereby a recycle $CO_2$ stream may be provided to the combustor at a sufficient flow volume and flow pressure. In some embodiments, a bypass line may be utilized to provide additional oxidant in place of the recycle $CO_2$ stream.

14 Claims, 1 Drawing Sheet

(51) Int. Cl.
*F23L 7/00* (2006.01)
*F01K 13/00* (2006.01)
*F02C 1/08* (2006.01)
*F02C 7/08* (2006.01)
*F01K 13/02* (2006.01)

(52) U.S. Cl.
CPC ............... *F02C 3/34* (2013.01); *F02C 7/08* (2013.01); *F23L 7/007* (2013.01); *F05D 2210/12* (2013.01); *F05D 2220/75* (2013.01); *F05D 2260/606* (2013.01); *F05D 2260/85* (2013.01)

(56) References Cited

U.S. PATENT DOCUMENTS

| | | | |
|---|---|---|---|
| 3,503,208 A | 3/1970 | Schmidt | |
| 3,544,291 A | 12/1970 | Schlinger et al. | |
| 3,736,745 A | 6/1973 | Karig | |
| 3,837,788 A | 9/1974 | Craig et al. | |
| 3,868,817 A | 3/1975 | Marion et al. | |
| 3,971,211 A | 7/1976 | Wethe et al. | |
| 3,976,443 A | 8/1976 | Paull et al. | |
| 4,132,065 A | 1/1979 | McGann | |
| 4,154,581 A | 5/1979 | Nack et al. | |
| 4,191,500 A | 3/1980 | Oberg et al. | |
| 4,193,259 A | 3/1980 | Muenger et al. | |
| 4,206,610 A | 6/1980 | Santhanam | |
| 4,434,613 A * | 3/1984 | Stahl | B01J 12/005 60/39.182 |
| 4,498,289 A | 2/1985 | Osgerby | |
| 4,522,628 A | 6/1985 | Savins | |
| 4,602,483 A | 7/1986 | Wilks et al. | |
| 4,702,747 A | 10/1987 | Meyer et al. | |
| 4,721,420 A | 1/1988 | Santhanam et al. | |
| 4,735,052 A | 4/1988 | Maeda et al. | |
| 4,765,143 A | 8/1988 | Crawford et al. | |
| 4,765,781 A | 8/1988 | Wilks et al. | |
| 4,839,030 A | 6/1989 | Comolli et al. | |
| 4,852,996 A | 8/1989 | Knop et al. | |
| 4,881,366 A | 11/1989 | Nurse | |
| 4,957,515 A | 9/1990 | Hegarty | |
| 4,999,992 A | 3/1991 | Nurse | |
| 4,999,995 A | 3/1991 | Nurse | |
| 5,175,995 A | 1/1993 | Pak et al. | |
| 5,247,791 A | 9/1993 | Pak et al. | |
| 5,265,410 A | 11/1993 | Hisatome | |
| 5,345,756 A | 9/1994 | Jahnke et al. | |
| 5,353,721 A | 10/1994 | Mansour et al. | |
| 5,394,686 A | 3/1995 | Child et al. | |
| 5,412,977 A * | 5/1995 | Schmohl | F01D 11/06 277/318 |
| 5,415,673 A | 5/1995 | Hilton et al. | |
| 5,421,166 A | 6/1995 | Allam et al. | |
| 5,507,141 A | 4/1996 | Stigsson | |
| 5,520,894 A | 5/1996 | Heesink et al. | |
| 5,564,896 A * | 10/1996 | Beeck | F01D 5/08 415/112 |
| 5,590,519 A | 1/1997 | Almlöf et al. | |
| 5,595,059 A | 1/1997 | Huber et al. | |
| 5,692,890 A | 12/1997 | Graville | |
| 5,709,077 A | 1/1998 | Beichel | |
| 5,715,673 A | 2/1998 | Beichel | |
| 5,724,805 A | 3/1998 | Golomb et al. | |
| 5,802,840 A | 9/1998 | Wolf | |
| 5,906,806 A | 5/1999 | Clark | |
| 5,937,652 A | 8/1999 | Abdelmalek | |
| 6,024,029 A | 2/2000 | Clark | |
| 6,064,122 A * | 5/2000 | McConnell | F02C 7/268 290/32 |
| 6,148,602 A | 11/2000 | Demetri | |
| 6,170,264 B1 | 1/2001 | Viteri et al. | |
| 6,196,000 B1 | 3/2001 | Fassbender | |
| 6,199,364 B1 | 3/2001 | Kendall et al. | |
| 6,202,574 B1 | 3/2001 | Liljedahl et al. | |
| 6,209,307 B1 | 4/2001 | Hartman | |
| 6,260,348 B1 | 7/2001 | Sugishita et al. | |
| 6,263,661 B1 | 7/2001 | Van der Burgt et al. | |
| 6,269,624 B1 | 8/2001 | Frutschi et al. | |
| 6,289,666 B1 | 9/2001 | Ginter | |
| 6,298,664 B1 | 10/2001 | Åsen et al. | |
| 6,333,015 B1 | 12/2001 | Lewis | |
| 6,389,814 B2 | 5/2002 | Viteri et al. | |
| 6,430,916 B2 | 8/2002 | Sugishita et al. | |
| 6,532,745 B1 | 3/2003 | Neary | |
| 6,536,205 B2 | 3/2003 | Sugishita et al. | |
| 6,543,214 B2 | 4/2003 | Sasaki et al. | |
| 6,550,234 B2 | 4/2003 | Guillard | |
| 6,598,398 B2 | 7/2003 | Viteri et al. | |
| 6,612,113 B2 | 9/2003 | Guillard | |
| 6,622,470 B2 | 9/2003 | Viteri et al. | |
| 6,629,414 B2 | 10/2003 | Fischer | |
| 6,637,183 B2 | 10/2003 | Viteri et al. | |
| 6,684,643 B2 | 2/2004 | Frutschi | |
| 6,764,530 B2 | 7/2004 | Iijima | |
| 6,775,987 B2 | 8/2004 | Sprouse et al. | |
| 6,802,178 B2 | 10/2004 | Sprouse et al. | |
| 6,820,689 B2 | 11/2004 | Sarada | |
| 6,824,710 B2 | 11/2004 | Viteri et al. | |
| 6,871,502 B2 | 3/2005 | Marin et al. | |
| 6,877,319 B2 | 4/2005 | Linder et al. | |
| 6,877,322 B2 | 4/2005 | Fan | |
| 6,898,936 B1 | 5/2005 | Ochs et al. | |
| 6,910,335 B2 | 6/2005 | Viteri et al. | |
| 6,918,253 B2 | 7/2005 | Fassbender | |
| 6,945,029 B2 | 9/2005 | Viteri | |
| 6,945,052 B2 | 9/2005 | Frutschi et al. | |
| 6,993,912 B2 | 2/2006 | Fischer | |
| 7,007,474 B1 | 3/2006 | Ochs et al. | |
| 7,007,486 B2 | 3/2006 | Sprouse et al. | |
| 7,021,063 B2 | 4/2006 | Viteri | |
| 7,022,168 B2 | 4/2006 | Schimkat et al. | |
| 7,043,920 B2 | 5/2006 | Viteri et al. | |
| 7,074,033 B2 | 7/2006 | Neary | |
| 7,089,743 B2 | 8/2006 | Frutschi et al. | |
| 7,111,463 B2 | 9/2006 | Sprouse et al. | |
| 7,124,589 B2 | 10/2006 | Neary | |
| 7,147,461 B2 | 12/2006 | Neary | |
| 7,191,587 B2 | 3/2007 | Marin et al. | |
| 7,192,569 B2 | 3/2007 | Stewart | |
| 7,281,590 B2 | 10/2007 | Van de Waal | |
| 7,284,362 B2 | 10/2007 | Marin et al. | |
| 7,299,637 B2 | 11/2007 | Becker | |
| 7,303,597 B2 | 12/2007 | Sprouse et al. | |
| 7,328,581 B2 | 2/2008 | Christensen et al. | |
| 7,334,631 B2 | 2/2008 | Kato et al. | |
| 7,360,639 B2 | 4/2008 | Sprouse et al. | |
| 7,363,764 B2 | 4/2008 | Griffin et al. | |
| 7,377,111 B2 | 5/2008 | Agnew | |
| 7,387,197 B2 | 6/2008 | Sprouse et al. | |
| 7,402,188 B2 | 7/2008 | Sprouse | |
| 7,469,544 B2 | 12/2008 | Farhangi | |
| 7,469,781 B2 | 12/2008 | Chataing et al. | |
| 7,503,178 B2 | 3/2009 | Bücker et al. | |
| 7,516,607 B2 | 4/2009 | Farhangi et al. | |
| 7,516,609 B2 | 4/2009 | Agnew | |
| 7,547,419 B2 | 6/2009 | Sprouse et al. | |
| 7,547,423 B2 | 6/2009 | Sprouse et al. | |
| 7,553,463 B2 | 6/2009 | Zauderer | |
| 7,615,198 B2 | 11/2009 | Sprouse et al. | |
| 7,665,291 B2 | 2/2010 | Anand et al. | |
| 7,717,046 B2 | 5/2010 | Sprouse et al. | |
| 7,722,690 B2 | 5/2010 | Shires et al. | |
| 7,731,783 B2 | 6/2010 | Sprouse et al. | |
| 7,739,874 B2 | 6/2010 | Nigro | |
| 7,740,671 B2 | 6/2010 | Yows et al. | |
| 7,740,672 B2 | 6/2010 | Sprouse | |
| 7,814,975 B2 | 10/2010 | Hagen et al. | |
| 7,826,054 B2 | 11/2010 | Zillmer et al. | |
| 7,827,797 B2 | 11/2010 | Pronske et al. | |
| 7,874,140 B2 | 1/2011 | Fan et al. | |
| 7,882,692 B2 | 2/2011 | Pronske et al. | |
| 7,927,574 B2 | 4/2011 | Stewart | |
| 7,934,383 B2 | 5/2011 | Gutierrez et al. | |

(56) References Cited

U.S. PATENT DOCUMENTS

| | | | |
|---|---|---|---|
| 7,950,243 B2 | 5/2011 | Gurin | |
| 7,966,829 B2 | 6/2011 | Finkenrath et al. | |
| 8,043,588 B2 | 10/2011 | Hustad et al. | |
| 8,088,196 B2 | 1/2012 | White et al. | |
| 8,109,095 B2 | 2/2012 | Henriksen et al. | |
| 8,220,248 B2 | 7/2012 | Wijmans et al. | |
| 8,334,011 B1* | 12/2012 | Kraemer | F01D 5/005 427/142 |
| 8,539,749 B1* | 9/2013 | Wichmann | F02C 6/06 60/39.52 |
| 8,596,075 B2 | 12/2013 | Allam et al. | |
| 8,631,639 B2* | 1/2014 | Garcia-Crespo | F01D 5/081 415/115 |
| 8,776,532 B2 | 7/2014 | Allam et al. | |
| 8,850,789 B2 | 10/2014 | Evulet et al. | |
| 8,959,887 B2 | 2/2015 | Allam et al. | |
| 8,986,002 B2 | 3/2015 | Palmer et al. | |
| 9,068,743 B2 | 6/2015 | Palmer et al. | |
| 9,903,316 B2* | 2/2018 | Gupta | F02B 47/10 |
| 2002/0134085 A1 | 9/2002 | Frutschi | |
| 2003/0131582 A1 | 7/2003 | Anderson et al. | |
| 2003/0221409 A1 | 12/2003 | McGowan | |
| 2004/0011057 A1 | 1/2004 | Huber | |
| 2004/0123601 A1 | 7/2004 | Fan | |
| 2004/0134197 A1 | 7/2004 | Marin et al. | |
| 2005/0028529 A1* | 2/2005 | Bartlett | B01D 53/1475 60/772 |
| 2005/0126156 A1 | 6/2005 | Anderson et al. | |
| 2006/0242907 A1 | 11/2006 | Sprouse et al. | |
| 2007/0180768 A1 | 8/2007 | Briesch et al. | |
| 2007/0274876 A1 | 11/2007 | Chiu et al. | |
| 2008/0010967 A1 | 1/2008 | Griffin et al. | |
| 2008/0104958 A1 | 5/2008 | Finkenrath et al. | |
| 2008/0115500 A1 | 5/2008 | MacAdam et al. | |
| 2008/0166672 A1 | 7/2008 | Schlote et al. | |
| 2008/0187877 A1 | 8/2008 | Fitzsimmons et al. | |
| 2008/0190214 A1 | 8/2008 | Ubowski et al. | |
| 2008/0309087 A1 | 12/2008 | Evulet et al. | |
| 2009/0025390 A1 | 1/2009 | Christensen et al. | |
| 2009/0056341 A1* | 3/2009 | Sanchez | F01D 25/12 60/772 |
| 2009/0061264 A1 | 3/2009 | Agnew | |
| 2009/0130660 A1 | 5/2009 | Faham et al. | |
| 2009/0229271 A1 | 9/2009 | Ruyck et al. | |
| 2009/0260585 A1 | 10/2009 | Hack et al. | |
| 2009/0301054 A1 | 12/2009 | Simpson et al. | |
| 2010/0018218 A1 | 1/2010 | Riley et al. | |
| 2010/0024378 A1 | 2/2010 | Ackermann et al. | |
| 2010/0024381 A1 | 2/2010 | Ackermann et al. | |
| 2010/0024433 A1 | 2/2010 | Ackermann et al. | |
| 2010/0031668 A1 | 2/2010 | Kepplinger | |
| 2010/0064656 A1* | 3/2010 | Lopez | F01D 9/02 60/39.24 |
| 2010/0077752 A1 | 4/2010 | Papile | |
| 2010/0300063 A1 | 12/2010 | Palmer et al. | |
| 2010/0326084 A1 | 12/2010 | Anderson et al. | |
| 2011/0036011 A1 | 2/2011 | Sprouse et al. | |
| 2011/0012773 A1 | 6/2011 | Freund et al. | |
| 2011/0179799 A1 | 7/2011 | Allam et al. | |
| 2011/0185701 A1 | 8/2011 | Koda et al. | |
| 2011/0233940 A1 | 9/2011 | Aoyama et al. | |
| 2011/0239651 A1 | 10/2011 | Aoyama et al. | |
| 2012/0067054 A1 | 3/2012 | Palmer et al. | |
| 2012/0067056 A1 | 3/2012 | Palmer et al. | |
| 2012/0073261 A1 | 3/2012 | Palmer et al. | |
| 2012/0237881 A1 | 9/2012 | Allam et al. | |
| 2013/0104525 A1 | 5/2013 | Allam et al. | |
| 2013/0104563 A1* | 5/2013 | Oelfke | F02C 1/007 60/773 |
| 2013/0118145 A1 | 5/2013 | Palmer et al. | |
| 2013/0199195 A1 | 8/2013 | Allam et al. | |
| 2013/0205746 A1 | 8/2013 | Allam et al. | |
| 2013/0213049 A1 | 8/2013 | Allam et al. | |
| 2013/0269355 A1* | 10/2013 | Wichmann | F02C 3/34 60/772 |
| 2013/0269356 A1* | 10/2013 | Butkiewicz | F02C 3/34 60/772 |
| 2013/0269357 A1* | 10/2013 | Wichmann | F02C 3/34 60/772 |
| 2013/0269362 A1* | 10/2013 | Wichmann | F02C 3/34 60/773 |
| 2013/0311068 A1* | 11/2013 | Rollinger | F02D 41/0065 701/104 |
| 2014/0000271 A1 | 1/2014 | Mittricker et al. | |
| 2014/0053529 A1 | 2/2014 | Allam et al. | |
| 2014/0083109 A1* | 3/2014 | Oelfke | F02C 3/34 60/772 |
| 2014/0331687 A1 | 11/2014 | Palmer et al. | |
| 2015/0361927 A1* | 12/2015 | Glugla | F02B 47/08 60/603 |
| 2016/0010551 A1* | 1/2016 | Allam | F02C 3/04 60/772 |
| 2016/0186658 A1* | 6/2016 | Vorel | F02C 3/34 701/108 |

FOREIGN PATENT DOCUMENTS

| | | |
|---|---|---|
| CN | 101324203 | 12/2008 |
| CN | 102834670 | 12/2012 |
| CN | 103221640 | 7/2013 |
| EP | 1698829 | 9/2006 |
| EP | 2426314 | 3/2012 |
| EP | 2650511 | 10/2013 |
| JP | 2225905 | 9/1990 |
| JP | 6-26362 | 2/1994 |
| JP | 3110114 | 11/2000 |
| JP | 2000-337107 | 12/2000 |
| JP | 2001-132472 | 5/2001 |
| JP | 3454372 | 10/2003 |
| WO | WO 95/12757 | 5/1995 |
| WO | WO 2009/041617 | 4/2009 |
| WO | WO 2012/003079 | 1/2012 |

OTHER PUBLICATIONS

Combs, Jr. "An Investigation of the Supercritical CO2 Cycle (Feher Cycle) for Shipboard Application," 1977, *Submitted in Partial Fulfillment of the Requirements for the Degree of Ocean Engineer and the Degree of Master of Science in Mechanical Engineering at the Massachusetts Institute of Technology*, 148.

Dostal et al., "A Supercritical Carbon Dioxide Cycle for Next Generation Nuclear Reactors," 2004, (Research Paper) *Advanced Nuclear Power Technology Program at MIT*, 326 pages.

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Convers. Mgmt*, 1997, Suppl. pp. S141-S146, vol. 38.

Mathieu et al., "Sensitivity Analysis of the MATIANT Cycle", *Energy Conversion & Management*, 1999, pp. 1687-1700, vol. 40.

Wall et al., "A Zero Emission Combustion Power Plant For Enhanced Oil Recovery," *Energy*, 1995, pp. 823-828, vol. 20, No. 8.

Yantovskii et al., "Computer Exergonomics of Power Plants Without Exhaust Gases," Energy Convers. Mgmt., Publ. 1992, vol. 33, No. 5-8, pp. 405-412.

http://www.graz-cycle.tugraz.at/pdfs/Bolland_Kvamsdal_Boden_Liege.pdf: Boland, "A Thermodynamic Comparison of the Oxy-Fuel Power Cycles Water-Cycle, Graz-Cycle and Matiant-Cycle," Norwegian University of Science and Technology, Trondheim, Norway.

http://www2.ulg.ac.be/genienue/pageco2.htm; Université de Liège, Department of Power Generation, "CO2 Researches".

* cited by examiner

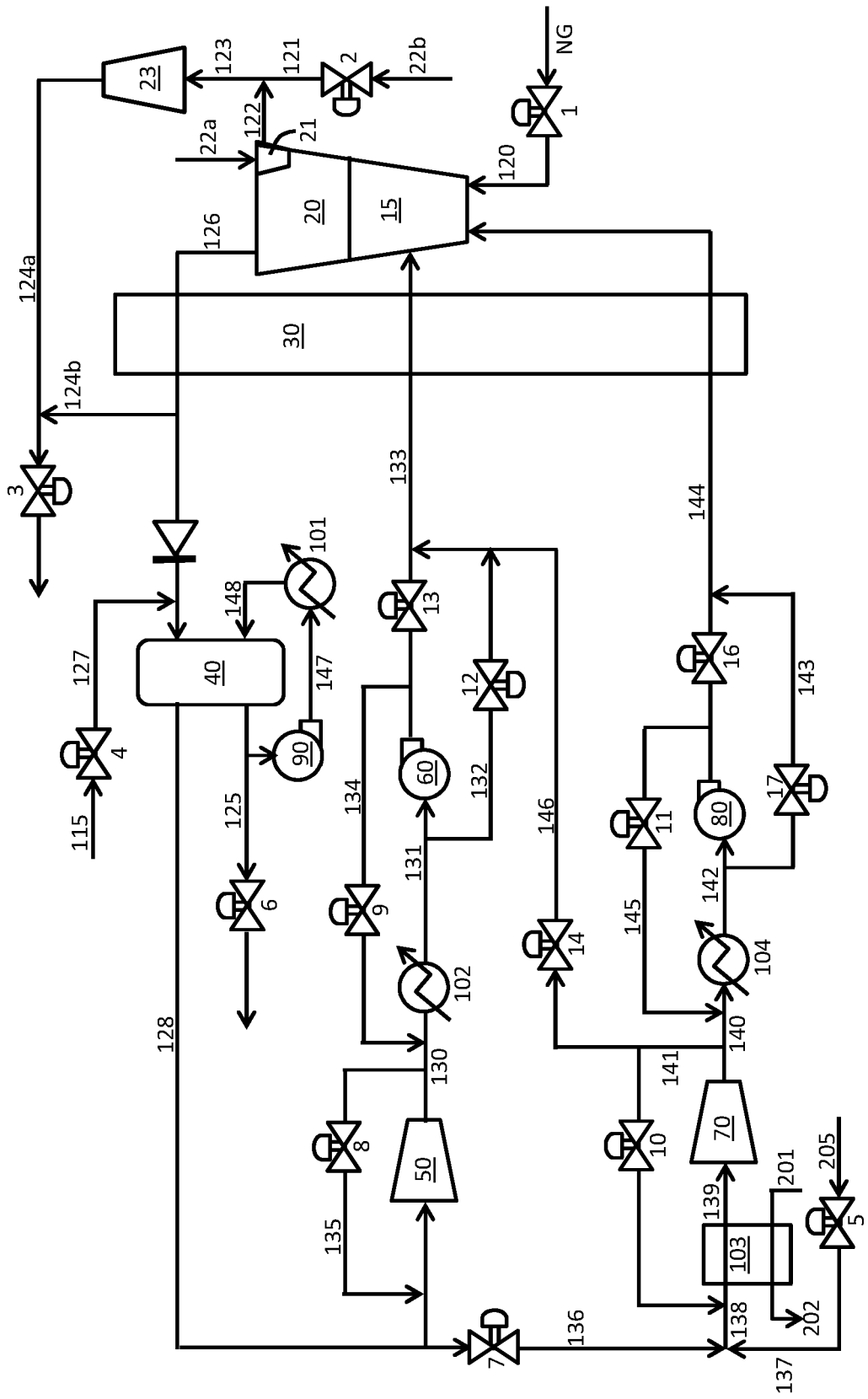

SYSTEM AND METHOD FOR STARTUP OF A POWER PRODUCTION PLANT

CROSS-REFERENCE TO RELATED APPLICATIONS

The present application claims priority to U.S. Provisional Patent Application No. 62/175,886, filed Jun. 15, 2015, the disclosure of which is incorporated herein by reference in its entirety.

FIELD OF THE DISCLOSURE

The presently disclosed subject matter relates to power production plants. Particularly, system configurations and methods are provided for startup of a power product plant.

BACKGROUND

Various systems and methods are known for production of power (e.g., electricity) via combustion of a fuel. For example, U.S. Pat. No. 8,596,075 to Allam et al., the disclosure of which is incorporated herein by reference, describes combustion cycles wherein $CO_2$ is used as a working fluid and all produced $CO_2$ from combustion may be captured (e.g., for sequestration or other use). Such systems in particular benefit from the recognized usefulness of heating a recycle $CO_2$ stream in a recuperative heat exchanger using heat from the hot turbine exhaust as well as adding further heat from a source other than the turbine exhaust.

Although various power production systems and methods may exhibit desired properties, the operating conditions of such systems may not account for certain requirements during specific phases of operation. In particular, special consideration may be required for operating conditions at startup of a power plant that may not be encompassed by the general operating conditions of the power plant in full production mode. Accordingly, there is a need for configurations that may be applied to power production plants that enables efficient startup and that allows for efficient changeover to normal operating configurations at the appropriate time.

SUMMARY OF THE DISCLOSURE

The present disclosure provides configurations that may be applied to a power production plant so that startup of the plant may proceed under a broader set of conditions that may otherwise be possible. In particular, the present disclosure enables startup of a combustion cycle power plant with combustor ignition below a turbine threshold speed that would otherwise be possible.

In some embodiments, the present disclosure relates to startup of power plants implementing a combustion cycle wherein $CO_2$ is utilized as a working fluid and wherein $CO_2$ formed in combustion may be captured. Examples of systems and methods for power production under such conditions are provided in U.S. Pat. No. 8,596,075 to Allam et al., U.S. Pat. No. 8,776,532 to Allam et al., U.S. Pat. No. 8,869,889 to Palmer et al., U.S. Pat. No. 8,959,887 to Allam et al., and U.S. Pat. No. 8,986,002 to Palmer et al., as well as U.S. Patent Publication Nos. 2012/0067056 to Palmer et al., 2012/0237881 to Allam et al., 2013/0104525 to Allam et al., and 2013/0118145 to Palmer et al., the disclosures of which are incorporated herein by reference in their entireties. Any combinations of process steps and system components may be utilized in the methods and systems of the present disclosure.

In some embodiments, for example, power production can be achieved utilizing a closed cycle or partially closed cycle system in which $CO_2$ is utilized as the working fluid. In such systems, a fossil fuel or a fuel derived from a fossil fuel (e.g., syngas derived from coal or other solid carbonaceous fuel) is completely combusted in a combustor with an oxidant (e.g., oxygen) to give an oxidized stream of predominantly $CO_2$, $H_2O$, excess $O_2$, and a quantity of impurities derived from oxidized components in the fuel or oxidant, such as $SO_2$, $NO_x$, Hg, and HCl. The oxygen may be mixed with $CO_2$. As a non-limiting example, the molar concentration of $O_2$ in the combined $O_2/CO_2$ stream can be about 10% to about 50%, about 15% to about 40%, or about 20% to about 30%. Solid fossil fuels, such as coal, lignite, or petroleum coke, that contain non-combustible ash may be converted to a gaseous fuel by partial oxidation in a single stage or multi-stage system. Such system, for example, may comprise a partial oxidation reactor. Alternatively, for example, such system may comprise a partial oxidation reactor and an ash and volatile inorganic component removal system. Such systems further comprise combustion of the fuel gas with oxygen in the combustor of the power production system. A preheated recycle $CO_2$ stream is mixed in the combustor with the combustion products in the formed fuel gas. Any combustor adapted for operation under conditions otherwise described herein may be used, and the recycle $CO_2$ stream may be introduced to the combustor by any means to be further heated by the combustion and, if desired, to quench and thereby control the temperature of the exit stream. In some embodiments, one or both of a PDX reactor and the combustor may utilize, for purposes of example only, a transpiration cooled wall surrounding the reaction or combustion space, and the preheated recycle $CO_2$ stream may pass through the wall to both cool the wall and to quench and thereby control the temperature of the exit stream. The transpiration flow promotes good mixing between the recycle $CO_2$ and the hot combusted fuel gas streams. Other types of combustors, however, may also be used, and the present disclosure is not limited to the use of transpiration cooled combustors. The combined combustion products and preheated recycle $CO_2$ leaving the combustor are at the temperature required for the inlet to a power-producing turbine. The hot turbine exhaust can be cooled in an economizing heat exchanger, which in turn preheats the high pressure $CO_2$ recycle stream.

The power production systems and methods may be operated under a combined set of conditions that may be characterized as the "normal" or "standard" operating parameters. Each condition (e.g., combustion temperature, turbine speed, compression ratios, etc.) making up the set of parameters may be within its own respective range, and the "normal" or "standard" operating parameters may be defined in relation to operation of the power production system or method in its power producing state.

A power production plant, however, cannot go from idle conditions to full operational mode instantaneously. Rather, the components of the power production plant must be brought up to normal operating parameters according to a particular algorithm. For example, in a power production system wherein a turbine and a compressor are provided on a common shaft, compressor output is limited by turbine speed, and combustion may not begin until the compressor is providing sufficient flow of the $CO_2$ recycle stream to appropriately mediate combustion temperature. Accordingly, combustor ignition may not be possible until the turbine reaches a certain threshold speed. In some embodiments, the shaft-driven compressor may not be capable of generating the required flow volume and flow pressure below a shaft speed that is about 85% of the final shaft speed—i.e., the shaft speed when the turbine is operating at its normal power production parameter. According to the present disclosure, however, systems and methods are provided wherein combustor ignition is possible below the turbine threshold value.

In some embodiments, the present disclosure thus provides a power production system. Such system can comprise: a combustor; a turbine; a first compressor, which may be a shaft-driven compressor on a common shaft with the turbine; an oxidant compressor, which may be a motor-driven compressor; an exhaust flow line configured for passage of a turbine exhaust stream from the turbine to the first compressor; a recycle flow line configured for passage of a $CO_2$ recycle stream from the first compressor to the combustor; an oxidant flow line configured for passage of an oxidant stream from the oxidant compressor to the turbine; and a bypass line configured for passage of at least a portion of the oxidant stream from the oxidant flow lines to the recycle flow lines. In further embodiments, the system may be defined by one or more of the following statements, which may be utilized in any combination and number.

The bypass line can include a valve.

The bypass line valve can be configured to be open below a first turbine threshold speed.

The bypass line valve can be configured to be closed above a second turbine threshold speed.

The power production system can comprise a recuperative heat exchanger.

The exhaust flow line, the recycle flow line, and the oxidant flow line can be configured for passage of their respective streams through the recuperative heat exchanger.

The first compressor can be a shaft-driven compressor.

The oxidant compressor can be a motor-driven compressor.

The turbine can include a gland seal and an air input.

The power production system further can comprise a gland seal compressor configured to receive and compress a stream of air and turbine exhaust from the gland seal.

The power production system further can comprise a vent in arrangement with the gland seal compressor and a vent line between the gland seal compressor and the vent.

The vent line between gland seal and the vent can be in a flow arrangement with the exhaust flow line, and the vent line and the exhaust flow line can be arranged relative to the vent for preferential flow to the vent from the respective lines.

In some embodiments, the present disclosure can provide methods for startup of a power production plant. For example, such method can comprise the following: pressurizing an oxidant stream in an oxidant compressor; passing pressurized oxidant from the oxidant compressor to a combustor through an oxidant flow line; combusting a fuel with the oxidant in the combustor; expanding a combustion product stream from the combustor in a turbine; cooling a turbine exhaust stream from the turbine in a recuperative heat exchanger; removing water from the turbine exhaust stream to form a $CO_2$ recycle stream; and compressing the $CO_2$ recycle stream in a shaft-driven compressor on a common shaft with the turbine to form a compressed $CO_2$ recycle stream for passage to the combustor in a recycle flow line; wherein the compressed $CO_2$ recycle stream is exhausted and oxidant from the motor-driven compressor is passed through the recycle flow line to the combustor until the turbine reaches a defined threshold speed. In further embodiments, the method may be defined by one or more of the following statements, which may be utilized in any combination and number.

The defined threshold speed can be about 85% of the normal operation speed.

The oxidant entering the oxidant compressor can be a mixture of $O_2$ and $CO_2$.

The oxidant entering the oxidant compressor can be air.

The turbine can include a gland seal, an air input, and a gland seal compressor configured to receive and compress a stream of air and turbine exhaust from the gland seal.

In some embodiments, substantially none of the compressed $CO_2$ recycle stream is passed to the combustor through the recycle flow line until the turbine reaches the defined threshold speed. Substantially none specifically can mean completely none or only a de minimis volume.

BRIEF DESCRIPTION OF THE FIGURE

Having thus described the disclosure in the foregoing general terms, reference will now be made to the accompanying drawing, which is not necessarily drawn to scale, and wherein the FIGURE shows a flow diagram of a power production system and method according to an exemplary embodiment of the present disclosure including a bypass line configured for passage of compressed oxidant to the recycle flow line during a startup stage, said flow being configured for shut-off once desired operating parameters are achieved.

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to systems and methods that provide power generation using predominantly $CO_2$ as a working fluid. In particular, the process uses a high pressure/low pressure ratio turbine that expands a mixture of a high pressure recycle $CO_2$ stream and combustion products arising from combustion of the fuel. Any fossil fuel, particularly carbonaceous fuels, may be used. Non-limiting examples include natural gas, compressed gases, fuel gases (e.g., comprising one or more of $H_2$, CO, $CH_4$, $H_2S$, and $NH_3$) and like combustible gases. Solid fuels—e.g., coal, lignite, petroleum coke, bitumen, biomass, and the like, or viscous liquid fuels may be used as well with incorporation of necessary system elements. For example, a partial oxidation combustor can be used to convert the solid or viscous liquid fuel to a fuel gas that is substantially free of solid particles. All fuel and combustion derived impurities, such as sulfur compounds, NO, $NO_2$, $CO_2$, $H_2O$, Hg, and the like can be separated for disposal with substantially or completely no emissions to the atmosphere. Pure oxygen can be used as the oxidant in the combustion process.

The hot turbine exhaust is used to partially preheat the high pressure recycle $CO_2$ stream. In combination with this heating, the recycle $CO_2$ stream can be further heated using additive heating that can be derived from a variety of sources (e.g., from an air separation unit or from the compression energy of a $CO_2$ compressor).

A power production method according to the present disclosure can comprise passing a compressed, heated recycle $CO_2$ stream into a combustor. The compressed, heated recycle $CO_2$ stream can be formed as further described below. In the combustor, a fuel can be combusted with oxygen (e.g., at least 98% or at least 99% pure $O_2$) in the presence of the recycle $CO_2$ stream to produce a $CO_2$ containing stream. The $CO_2$ containing stream from the combustor can have a temperature of about 500° C. or greater (e.g., about 500° C. to about 1,700° C.) and a pressure of about 150 bar (15 MPa) or greater (e.g., about 150 bar (15 MPa) to about 500 bar (50 MPa). The $CO_2$ containing stream can be passed through a turbine to expand the $CO_2$ containing stream, generate power, and form a turbine exhaust stream comprising $CO_2$. The $CO_2$ containing stream can be expanded across the turbine at a desired pressure ratio.

The turbine exhaust stream can be processed to remove combustion products and any net $CO_2$ produced by combustion of the fuel. To this end, the turbine exhaust stream can be cooled by passage through a heat exchanger. Any suitable heat exchanger suitable for use under the temperature and pressure conditions described herein can be utilized. In some embodiments, the heat exchanger can comprise a series of at least two, at least three, or even more economizer heat exchangers. A single heat exchanger with at least two sections, at least three sections (or even more sections) can be used. For example, the heat exchanger may be described has having at least three heat exchange sections operating across different temperature ranges. Withdrawn heat from the turbine exhaust stream can be utilized for heating the recycle $CO_2$ stream as described below.

The turbine exhaust stream can be divided into two or more portions. The first portion can comprise 50% or greater, 70% or greater, or 90% or greater (but less than 100%) of the total mass flow of the turbine exhaust stream. All or a portion of the turbine exhaust stream can be passed through a separator to remove water and can be further treated to remove other combustion products or impurities. The resulting stream can be described as a main recycle $CO_2$ stream. A portion of the main recycle $CO_2$ stream can be combined with oxygen to form the oxidant stream, which can be compressed in one or more stages to the desired combustor input pressure. A portion of the main recycle $CO_2$ stream can be compressed such as in a multi-stage compressor with intercooling between the stages. Preferably, the main recycle $CO_2$ stream (alone or combined with the oxygen) is compressed to a pressure of about 40 bar (4 MPa) to about 400 bar (40 MPa), about 80 bar (8 MPa) to about 200 bar (20 MPa), or about 100 bar (10 MPa) to about 150 bar (15 MPa). The compressed recycle $CO_2$ stream is then passed back through the heat exchangers to be heated. The compressed recycle $CO_2$ stream is heated using the heat withdrawn from the turbine exhaust stream (which can be characterized as the heat of combustion that remains in the turbine exhaust stream). In order to achieve a close temperature approach between the turbine exhaust stream and the heated, compressed recycle $CO_2$ stream leaving the heat exchanger and entering the combustor, additional heat (e.g., heat of compression) can be added. The use of the additive heating can be beneficial to reduce temperature differential between the turbine exhaust stream and the heated, compressed recycle $CO_2$ stream leaving the heat exchanger and entering the combustor to about 30° C. or less, about 25° C. or less, or about 20° C. or less, such as about 2° C. to about 20° C., or about 2° C. to about 10° C.

While the above is provided as being exemplary of normal operating parameters for various components and process steps of the power production system and method, certain conditions must be implemented in order to transition from an idle state to a normal operating state wherein such conditions may be applicable to all components of the system. FIG. 1 illustrates a flow diagram of a power production system and method according to the present disclosure wherein a bypass line is included. The bypass line provides for passage of compressed oxidant to the recycle flow line, such bypass flow being controllable via one or more valves such that the flow can be turned on during startup and turned off once desired operating parameters are achieved. When the bypass line is actively passing oxidant to the recycle line, flow of $CO_2$ recycle stream from the shaft-driven compressor can be shut off so that the $CO_2$ recycle stream is not passing into the recycle flow line. In particular, the $CO_2$ recycle stream may be exhausted during startup, or this flow may be allowed to recycle around the shaft-driven compressor to allow the compressor to move from idle to a point to within its operational range. Such configuration during startup is desirable because the shaft-driven compressor that is utilized to compress the $CO_2$ recycle stream cannot provide the required flow volume and flow pressure to properly regulate the combustion temperature in the combustor until the speed of the shaft shared by the compressor and the turbine is functioning at the turbine threshold speed or greater. The oxidant compressor, however, can be a motor-driven compressor and, as such, may be operated so as to provide the required flow volume and flow pressure for input to the combustor, even during the startup time wherein the shaft speed is below the turbine threshold speed. It is understood that the combustion chemistry during this startup stage would be different than the combustion chemistry during normal power production operation. This is because a greater percentage of oxidant is being utilized in the combustor than would be present if the $CO_2$ recycle stream was being flowed to the combustor. Since the startup stage is sufficiently short in duration, the difference in combustion chemistry is not detrimental to the overall system and methods. In addition, this chemistry is quickly diluted once the system is operating under normal operating parameters.

Once the turbine has been operational for a sufficient duration to achieve the turbine threshold speed, the bypass line can be closed, and flow of the $CO_2$ recycle stream can begin to pass through the recycle flow line to the combustor for normal operation. In some embodiments, the turbine threshold speed can be about 50% or greater of the speed at which the turbine operates in the normal, power production mode. In further embodiments, the turbine threshold speed can be about 60% or greater, about 70% or greater, about 80% or greater, about 85% or greater, or about 90% or greater of the speed at which the turbine operates in the normal, power production mode.

Once the turbine threshold speed is achieved, the bypass line can be closed. For example, a valve in the line may be closed. As the bypass line valve closes, the flow controller for the $CO_2$ recycle stream compressor will cause the $CO_2$ recycle stream to begin to flow into and through the recycle flow line and to the combustor. In this manner, the flow regulating the combustion temperature is continuous even though the chemistry may be changing as the oxidant stream is replaced by the $CO_2$ recycle stream.

In the exemplary embodiments illustrated in the FIGURE, natural gas (NG) fuel passes through valve 1 and line 120 into the combustor 15 where it is combusted with oxygen in the presence of $CO_2$ to form a combustion product stream that is expanded in the turbine 20 to produce turbine exhaust stream 126. Air from air source 22a passes through the gland seal 21 to combine with exhaust from the turbine escaping around the gland seal and form stream 122, which becomes stream 123, and which is compressed in the gland seal compressor 23 to form stream 124a. In some cases, valve 2 is opened and air from air source 22b exits valve 2 as air stream 121, which air stream mixes with stream 122 to form stream 123, which stream can contain a large fraction of air. In some embodiments, the system can be configured for preferential flow of one or more streams through one or more valves. For example, line 124a and line 126 (after exiting the heat exchanger 30) can be configured relative to valve 3 such that line 124a is closer to the valve than line 126. This allows the vent flow through valve 3 to preferentially use the flow from line 124a, instead of the flow from line 126. The configuration can be adjusted to provide desired flow mixtures as desired. Because of this, any contaminants which enter the system from air ingress 22a or 22b can be minimized since the contaminants can be preferentially sent to the vent (valve 3). In addition, operation of gland seal compressor 23 can also minimize air leakage and therefore contaminants entering the system.

The turbine exhaust stream 126 is cooled in the heat exchanger 30, and any portion of stream 124a not vented through valve 3 can be combined with the cooled turbine exhaust stream 126 through stream 124b. $CO_2$ from $CO_2$ source 115 passes through valve 4 and line 127 and is combined with the cooled turbine exhaust stream 126 before passage through the separator 40. Water stream 125 from the separator 40 can be drawn off through valve 6 and/or compressed in pump 90 to form stream 147, which is cooled in water cooler 101 to form stream 148 that is recycled into the separator. Substantially pure $CO_2$ exits the separator 40 as a recycle stream in line 128 and is compressed in main compressor 50 to form compressed $CO_2$ recycle stream 130 that is cooled in water cooler 102 to form stream 131 that passes through main pump 60 and is directed to the combustor 15 in recycle line 133 passing through valve 13. A portion of stream 130 may pass through valve 8 and line 135 for recirculation through the main compressor 50. A portion of the compressed $CO_2$ recycle stream from recycle line 133 may be drawn off in line 134 upstream of valve 13 and passed through valve 9 for recirculation through the water cooler 102. The $CO_2$ recycle stream in line 131 may bypass the pump 60 in pump bypass line 132 which includes the exit valve 12 for the main compressor 50.

A portion of the $CO_2$ recycle stream from line 128 may pass through valve 7 to line 136 to combine with oxygen from oxygen source 205 through valve 5 and line 137 to form oxidant stream 138. The oxidant stream 138 (a $O_2/CO_2$ mixture) is passed through heat exchanger 103 to form stream 139, which is compressed in the oxidant compressor 70 and exits in line 140. A portion of the compressed oxidant stream from line 140 may pass in line 141 through valve 10 for recirculation through the heat exchanger 103. In heat exchanger 103, the oxidant stream 138 may be heated or cooled. For example, input 201 may be a cold water stream that exits as heated output 202 such that oxidant stream 139 is cooled relative to stream 138. Alternatively, input 201 may be a hot water stream that exits as cooled output 202 such that oxidant stream 139 is heated relative to stream 138. Compressed oxidant in line 140 passes through water cooler 104 to form stream 142, which passes through $O_2/CO_2$ pump 80 and valve 16 before the oxidant passes through oxidant line 144 to the combustor 15 for combustion of the fuel therein. Oxidant can bypass the pump 80 in oxidant bypass line 143 through the oxidant exhaust valve 17. Startup bypass line 146 interconnects line 141 and pump bypass line 132 and includes valve 14.

In operation, during startup, the exit valve 12 for the main compressor 50 is closed (as are valve 9 in lines 134 and valve 13 in recycle line 133). As such, the $CO_2$ recycle stream 128 does not pass for recycle to the combustor 15. Oxygen flowing through valve 5 and line 137 (and mixing with recycled $CO_2$ from line 136) is cooled (or heated) in heat exchanger 103 and compressed in oxidant compressor 70 (which can be a motor-driven compressor). A portion of the compressed oxidant (mixed $O_2/CO_2$) from line 140 is cooled in cooler 104 and bypasses pump 80 in pump bypass line 143 (with valve 17 open and valve 16 closed) to pass through oxidant line 144 to the combustor. A portion of the compressed oxidant from line 140 also passes through line 141 to the startup bypass line 146. Since the exit valve 12 for the main compressor is closed, the oxidant that would otherwise combine with the $CO_2$ passing through the pump bypass line 132 passes through the recycle line 133 to the combustor 15. Operation proceeds in this fashion until the turbine has achieved the turbine threshold value and the shaft for the shaft-driven compressor 50 is thus working at a sufficient speed for the shaft-driven compressor 50 to provide the $CO_2$ recycle stream at a sufficient flow volume and flow pressure. At that point, the bypass line valve 14 is closed, and the exit valve 12 for the main compressor is opened. Oxidant no longer passes through the recycle line 133 and only passes through the oxidant line 144. With the turbine operating at a speed above the threshold speed, the compressor 50 provides the $CO_2$ recycle stream through recycle line 133 at the required flow volume and flow pressure for input to the combustor 15.

In some embodiments, two different turbine threshold speeds may be utilized to provide a gradual changeover from the startup stage to the normal power production stage. A first turbine threshold speed may be utilized to trigger closing of the bypass line valve (and thus opening of the main compressor exhaust valve). Closing and opening of the valves may not be immediate. As the turbine speed continues to increase, a second turbine threshold may be achieved at which point the bypass line valve may be completely closed.

The above configuration may be modified in one or more embodiments. For example, the oxygen supply to the oxidant compressor 70 can be supplied to the compressor via the air ingress at stream 121 instead of through the oxygen supply at stream 137. In such embodiments, gland seal compressor 23 will effectively fill the plant with air while valves 4 and 5 are closed. Oxidant compressor 70 will still supply the turbine with an oxidant flow (air, in such embodiments) through stream 144 and through the bypass via stream 133. Alternatively, $CO_2$ from the $CO_2$ supply 115 entering through valve 4 and stream 127 can be connected to the suction of gland seal compressor 23. In such embodiments, valve 4 will be open while air will pass through valve 2. The plant will fill with an air and $CO_2$ mixture with oxidant compressor 70 still controlling the supply of fluids through streams 144 and 133.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A power production system comprising:
   a combustor;
   a turbine that includes a gland seal and an air input;
   a first compressor that is a shaft-driven compressor driven by the turbine;
   an oxidant compressor;
   an exhaust flow line configured for passage of a turbine exhaust stream from the turbine to the first compressor;
   a recycle flow line configured for passage of a $CO_2$ recycle stream from the first compressor to the combustor;
   an oxidant flow line configured for passage of an oxidant stream from the oxidant compressor to the combustor;
   a bypass line configured for passage of at least a portion of the oxidant stream from the oxidant flow line to the recycle flow line;
   a gland seal compressor configured to receive and compress a stream of air and turbine exhaust from the gland seal;
   a vent in arrangement with the gland seal compressor to receive a flow from the gland seal compressor: and
   a vent line between the gland seal compressor and the vent.

2. The power production system according to claim 1, wherein the bypass line includes a valve.

3. The power production system according to claim 2, wherein the bypass line valve is configured to be open below a first turbine threshold speed.

4. The power production system according to claim 2, wherein the bypass line valve is configured to be closed above a second turbine threshold speed.

5. The power production system according to claim 1, further comprising a recuperative heat exchanger.

6. The power production system according to claim 5, wherein the exhaust flow line, the recycle flow line, and the oxidant flow line are configured for passage of their respective streams through the recuperative heat exchanger.

7. The power production system according to claim 1, wherein the oxidant compressor is a motor-driven compressor.

8. The power production system according to claim 1, wherein the vent line between the gland seal compressor and the vent is in a flow arrangement with the exhaust flow line, and wherein the vent line and the exhaust flow line are arranged relative to the vent for preferential flow to the vent from the respective lines.

9. A method for startup of a power production plant, the method comprising:
   pressurizing an oxidant stream in a motor-driven oxidant compressor;
   passing pressurized oxidant from the oxidant compressor to a combustor through an oxidant flow line;
   combusting a fuel with the oxidant in the combustor;
   expanding a combustion product stream from the combustor in a turbine;
   cooling a turbine exhaust stream from the turbine in a recuperative heat exchanger;
   removing water from the turbine exhaust stream to form a $CO_2$ recycle stream; and
   compressing the $CO_2$ recycle stream in a shaft-driven compressor driven by the turbine to form a compressed $CO_2$ recycle stream configured for passage to the combustor in a recycle flow line passing through the recuperative heat exchanger;
   wherein the compressed $CO_2$ recycle stream is recirculated and oxidant from the motor-driven oxidant compressor is passed through the recycle flow line to the combustor until the turbine reaches a defined threshold speed that is 50% of the normal operation speed.

10. The method according to claim 9, wherein the defined threshold speed is 85% of the normal operation speed.

11. The method according to claim 9, wherein the oxidant entering the oxidant compressor is a mixture of $O_2$ and $CO_2$.

12. The method according to claim 9, wherein the oxidant entering the oxidant compressor is air.

13. The method according to claim 12, wherein the turbine includes a gland seal, an air input, and a gland seal compressor configured to receive and compress a stream of air and turbine exhaust from the gland seal.

14. The method according to claim 9, wherein substantially none of the compressed $CO_2$ recycle stream is passed to the combustor through the recycle flow line until the turbine reaches the defined threshold speed.

* * * * *